United States Patent [19]

MacLaren et al.

[11] Patent Number: 5,930,496

[45] Date of Patent: Jul. 27, 1999

[54] COMPUTER EXPANSION SLOT AND ASSOCIATED LOGIC FOR AUTOMATICALLY DETECTING COMPATIBILITY WITH AN EXPANSION CARD

[75] Inventors: John M. MacLaren, Cypress; Brian Hausauer, Spring; Usha Rajagopaian, Houston, all of Tex.

[73] Assignee: Compaq Computer Corporation, Houston, Tex.

[21] Appl. No.: 08/938,361

[22] Filed: Sep. 26, 1997

[51] Int. Cl.$^6$ .......................................................... G06F 3/00
[52] U.S. Cl. .............................................. 395/500; 439/55
[58] Field of Search ............................ 395/500; 364/578; 439/55

[56] References Cited

U.S. PATENT DOCUMENTS

| | | | |
|---|---|---|---|
| 5,734,919 | 3/1998 | Walsh et al. | 395/800 |
| 5,781,748 | 7/1998 | Santos et al. | 395/308 |
| 5,812,797 | 9/1998 | Crane, Jr. et al. | 395/306 |

OTHER PUBLICATIONS

PCI Special Interest Group, "PCI Local Bus", Ch. 7, pp. 219–232, Jun. 1, 1995.

*Primary Examiner*—Kevin J. Teska
*Assistant Examiner*—A. S. Roberts
*Attorney, Agent, or Firm*—Conley, Rose & Tayon, P.C.; Michael F. Heim; Jonathan M. Harris

[57] ABSTRACT

An apparatus and method for determining the types of expansion cards connected to the expansion slot connectors of a computer system. Detect signals are provided to decode logic for determining the types of expansion cards connected to the computer system. If the expansion cards are compatible the decode logic produces an output power supply signal that indicates what the voltage level should be for the power supply to the cards. If the cards are incompatible, the decode logic may not provide power to any of the cards or only provide power to some of the cards that are compatible. For computers that allow expansion cards to connect to the computer while the computer is powered on, hot-plug logic cooperates with the decode logic to establish power and communication with newly connected interface cards. The connectors in the computer do not include keys and thus interface cards without keys, as well as cards with different types of key arrangements can be connected to and communicate with the computer. A removable keyed adapter can be mated with the expansion slot connectors to effectively provide keys to the expansion slot connectors to ensure reliable connections between the interface cards and expansion slot connectors. The adapters can be keyed in variety of arrangements to match whatever keying arrangements are included on the interface cards. In an alternative embodiment, voltage drops are provided to quick switches to ensure signaling compatibility between different card types. Further, all expansion slot connectors can be keyed for only a subset of the possible card types available and thus reduce the logic necessary to ensure compatibility.

37 Claims, 6 Drawing Sheets

COMPUTER EXPANSION SLOT AND ASSOCIATED LOGIC FOR AUTOMATICALLY DETECTING COMPATIBILITY WITH AN EXPANSION CARD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a system for interfacing peripheral computer cards to a personal computer (PC) system. More particularly, the present invention relates to a PC system that includes expansion slots for receiving expansion cards and for automatically determining the compatibility of the expansion card with the expansion slot. Still more particularly, the invention relates to a universal expansion interface slot and logic for determining the type of expansion card plugged into the expansion slot to allow the computer to communicate properly to the expansion card.

2. Background of the Invention

A PC system typically includes a combination of fixed internal components and peripheral external components that have been added to the system to provide features not included as part of the fixed PC system. To accommodate the peripheral devices that a user may choose to add to the PC system, computer manufacturers typically provide expansion slots and ports to facilitate the system expansion. The PC system supplied by the computer manufacturer typically includes a main printed circuit board (commonly referred to as the "motherboard") on which most of the fixed internal circuitry of the PC is mounted. The circuitry mounted on the motherboard typically comprises integrated circuits (IC's). The various IC's on the motherboard electrically connect via electrical buses on the motherboard, including, for example a host bus that connects the central processing unit (CPU) to the memory controller, and a system bus that connects to the other system components. Additional peripheral busses may also be provided in the computer system.

The motherboard also typically includes sockets or external connections for receiving peripheral expansion cards to supplement the circuitry provided on the motherboard. To minimize space on the motherboard, one or more riser boards may be used that connect electrically to the motherboard. A riser board extends vertically from the motherboard (which typically is positioned horizontally in the PC chassis) and includes multiple expansion slots. The expansion slots are displaced vertically on the riser card, enabling computer expansion cards to be inserted horizontally into the expansion slots.

PC systems generally include one or more peripheral busses interconnecting the expansion slots to the system bus. The peripheral busses thus support connection of peripheral components via expansion cards to provide a variety of functions such as network connections, extended memory, enhanced audio and video capabilities, and many other capabilities not available in the circuitry provided by the computer manufacturer on the motherboard. Various peripheral busses are available, including ISA, EISA, PCI, USB, and other suitable busses. These busses provide a communication path between the peripheral components and other system components, such as the central processing unit ("CPU"). For purposes of this invention, the expansion slots will be described assuming a connection to the PCI (Peripheral Computer Interface) bus, with the understanding that the principles of the present invention may be applied to other peripheral bus systems that support expansion cards. Like other bus protocols, the PCI bus standard dictates the clock signal frequency, power supply and signal voltage levels, as well as other electrical and timing parameters, communication protocols, and physical restrictions to insure compatibility between expansion cards and expansion slots that are provided by different manufacturers.

Currently, two PCI bus standards exists. A 5 volt PCI standard requires the bus to operate at 33 MHz and allows both 3.3 volt and 5 volt signal levels. The 3.3 volt standard allows both 33 MHz and 66 MHz bus frequencies, and allows only 3.3 volt signal levels, precluding 5 volts signal levels. To determine an appropriate bus frequency for a 3.3 volt PCI bus, the computer system decodes a M66EN signal from each card on the bus. In accordance with the 3.3 volt PCI standard, the M66EN signal defines the appropriate frequency for that card. Because of the frequency and voltage differences between the standards, an interface expansion card designed to the 5 volt standard cannot be connected to a PCI bus designed to the 3.3 volt standard. Connecting an expansion card to an incompatible expansion slot could lead to permanent system and card damage. To provide for the ability to interface with expansion cards designed to either the 3.3 volt or 5 volt standards, many PC system include one or more PCI busses dedicated to each standard. For example, a PC system may include two PCI busses, one PCI bus operating as a 3.3 volt bus and the other operating as a 5 volt bus. Providing both bus types in a PC system is desirable for compatibility with both types of interface cards.

Figure 1A:
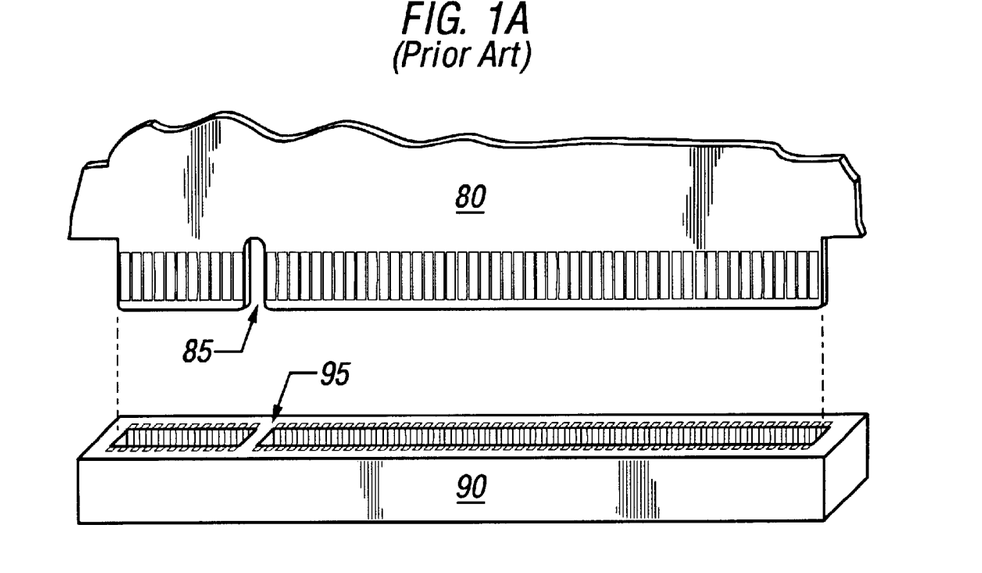
FIGS. 1A and 1B show expansion slots with a key and an expansion card connector with a key recess in accordance with prior art techniques.
Figure 1B:
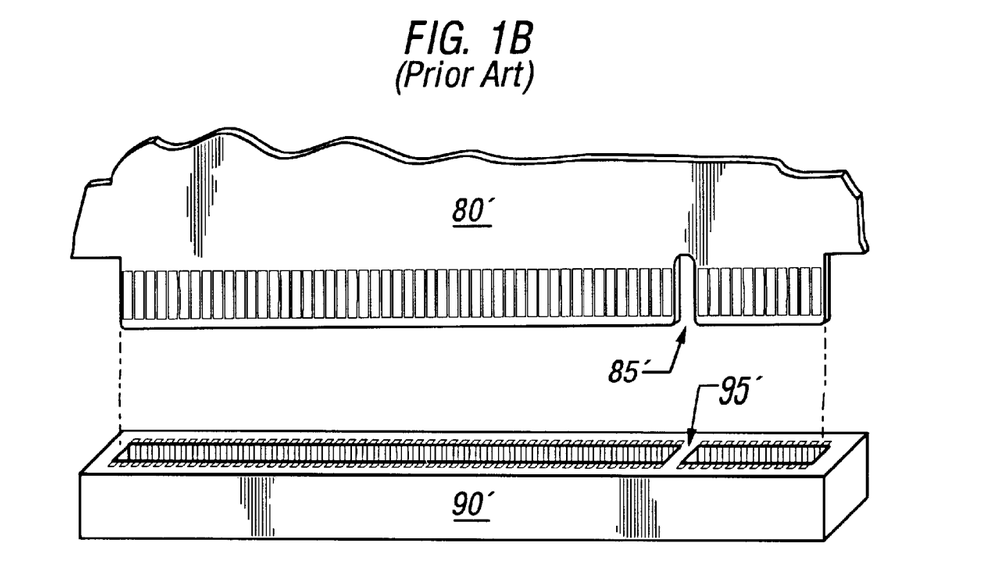

To prevent the connection of an expansion card to an incompatible peripheral bus in a PC, the expansion slots provided in the PC system typically include physical "keys". Referring to FIG. 1A, the PCI expansion slot 90 mates with expansion card connector 80. Similarly, PCI expansion slot 90' in FIG. 1B mates with expansion card connector 80'. As illustrated in FIGS. 1A and 1B, each expansion slot 90, 90' includes a key 95, 95'. Keys 95, 95' are mechanical tabs manufactured as a part of the PCI expansion slot in place of connector pins. For a PCI expansion card to plug into a keyed expansion slot, the PCI expansion card must have a mating key recess (such as recess 85, 85') that fits over the key 95, 95'.

The expansion slots for a 3.3 volt PCI bus and for a 5 volt PCI bus are similar, in terms of overall size and pin arrangement. However, to prevent a PCI expansion card from being plugged into an incompatible PCI expansion slot, a 3.3 volt expansion slot has a key located in a different place on the connector than a 5 volt expansion slot. Thus, an interface card keyed to a 3.3 volt expansion slot cannot physically be inserted into a 5 volt expansion slot, and vice versa. Referring again to FIGS. 1A and 1B, the expansion slot 90 (FIG. 1A) represents a socket keyed to accept an expansion card 80 operating at 3.3 volt signal levels, while expansion slot 90' (in FIG. 1B) represents a socket keyed to accept an expansion card 80' operating at 5 volt signal levels.

Figure 1C:
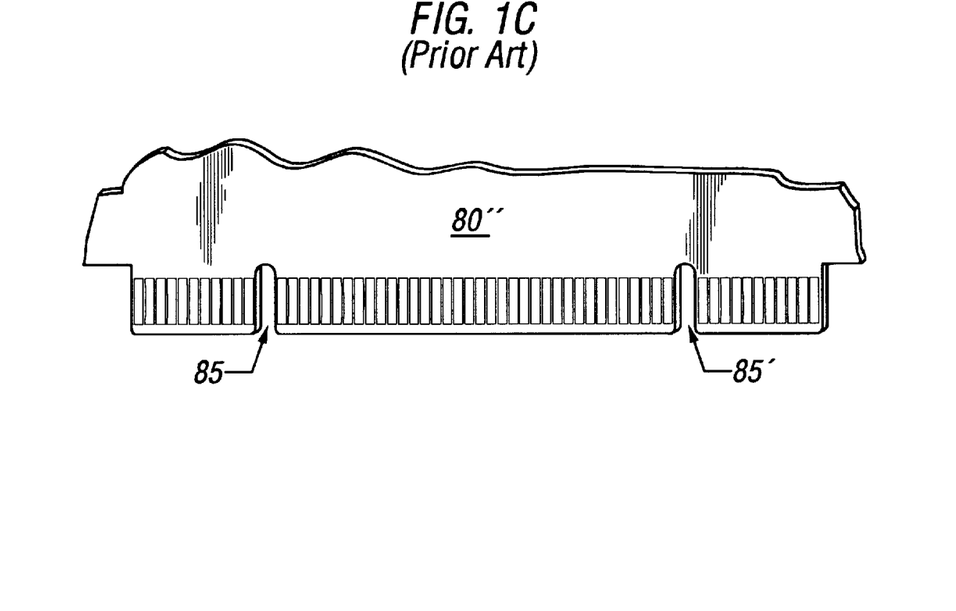
FIG. 1C shows a universal expansion card connector with two key recesses in accordance with prior art techniques.

Some PCI expansion cards are referred to as "universal" cards because these cards have key recesses 85, 85' in both locations as shown in FIG. 1C. As such, a universal card 80"

physically can be connected to any PCI expansion slot, regardless of whether the expansion slot connector has one or both keys 95, 95'. Universal cards typically are designed to be 5 volt tolerant, which means that universal cards can receive and properly operate with both 5 volt and 3.3 volt signal levels. Because a logic high level for 5 volt signaling on a PCI bus includes voltages exceeding 2 V, a universal card with 5 volt tolerant inputs and which drives 3.3 volt output signals can be connected to either a 3.3 volt or a 5 volt bus. Universal cards also may be designed for 33 or 66 MHz operation. All 66 MHz universal cards, however, can operate at either 33 MHz or 66 MHz. With 5 volt tolerant inputs, 66 MHz universal cards thus can operate with either 5 volt or 3.3 volt signal levels and at frequencies of either 33 MHz or 66 MHz. All 33 MHz universal cards can operate with either voltage level, but can only operate at a frequency of 33 MHz.

In addition to insuring compatibility between expansion cards and expansion slots, the connector keys also insure the integrity of the connection between the expansion slot and the mating expansion card. Without keys, an expansion card may not be properly aligned in the expansion slot. Thus, the expansion card may be off-center or skewed in the expansion slot. In such a situation, there is a risk that some of the pins in the expansion slot may not mate properly with the expansion card. Further, there is a risk that pins on the connectors may improperly short posing the potential for damage to the computer system and the expansion card.

Because of the aforementioned compatibility problems, computers with multiple PCI busses necessarily have each expansion slot dedicated to a particular PCI bus standard and use physical keys in the slots to prevent insertion of an expansion card into an incompatible expansion slot. Dedicating expansion slots to a particular PCI bus standard, however, reduces the flexibility of the computer system. This problem results from the computer manufacturer having to predetermine which slots are dedicated to each PCI bus standard. This determination may coincide with the preferences of some operators, but not all. The problem is exemplified by a computer having two slots dedicated to a 5 volt PCI bus and two slots dedicated to a 3.3 volt bus. A user who only has one 3.3 volt expansion cards does not need two 3.3 volt expansion slots. Such an operator might prefer more 5 volt slots, and only one 3.3 volt slot. Further, the user's preferences may change as new interface expansion cards become available or as the user's computing needs change.

Although universal PCI expansion cards could be provided that are operable with either 5 volt signal levels or 3.3 volt levels, the fact remains that 3.3 volt and 5 volt cards are still available and still in use. Because users may have a mix of all three card types (3.3 volt, 5 volt, and universal), a computer system that cannot handle all of the available expansion cards may not be well-received by consumers.

It would be advantageous to develop a computer system that accepts all expansion cards and automatically determines the type of expansion card plugged into an expansion slot before the peripheral bus becomes fully operational. Such an expansion slot could then be connected to the appropriate peripheral bus, or alternatively an appropriate error message could be generated to the operator, without the risk of damage occurring to the system if an incompatible expansion card is inserted in a slot.

BRIEF SUMMARY OF THE INVENTION

The problems outlined above are in large part solved by an interface system in a computer that determines the types of expansion cards connected to the expansion slots in the computer system. The expansion slots in the computer system include electrical connectors and decode logic that determine the type of expansion card inserted into each expansion slot during system initialization or at other appropriate times. If the cards are compatible with the associated expansion slot, the decode logic determines the appropriate voltage level of power to be provided to the cards. If the cards are incompatible, the computer may not provide power to any of the cards or only provide power to some of the cards that are compatible. For computers that allow interface cards to be connected to the computer while the computer is already on, the interface system establishes power and communication with newly connected interface cards. The expansion slot connectors do not include keys and thus interface cards with or without recesses can be connected to and communicate with the computer. A removable keyed adapter can be mated with the expansion slot connectors to provide keys to the expansion slot connectors to insure reliable connections between the interface cards and expansion slot connectors. The adapter can be keyed in a variety of arrangements to match whatever keying arrangements are included on the interface cards.

In an alternative embodiment, a signal converter in the computer system is used to convert between different signal voltage levels. Thus, if incompatible cards are coupled to the same bus, the converter makes the signal voltage levels of the cards compatible. Further still, the expansion slot connectors can be keyed for only a subset of the possible card types available and thus reduce the logic necessary to ensure compatibility.

These and other advantages of the present invention will be apparent to one skilled in the art upon reading the following detail description of the invention.

BRIEF DESCRIPTION OF THE DRAWINGS

A more detailed description of the invention is presented in the detailed description of the preferred embodiment, which should be considered in conjunction with the drawings.

DETAILED DESCRIPTION OF THE INVENTION

Figure 2:
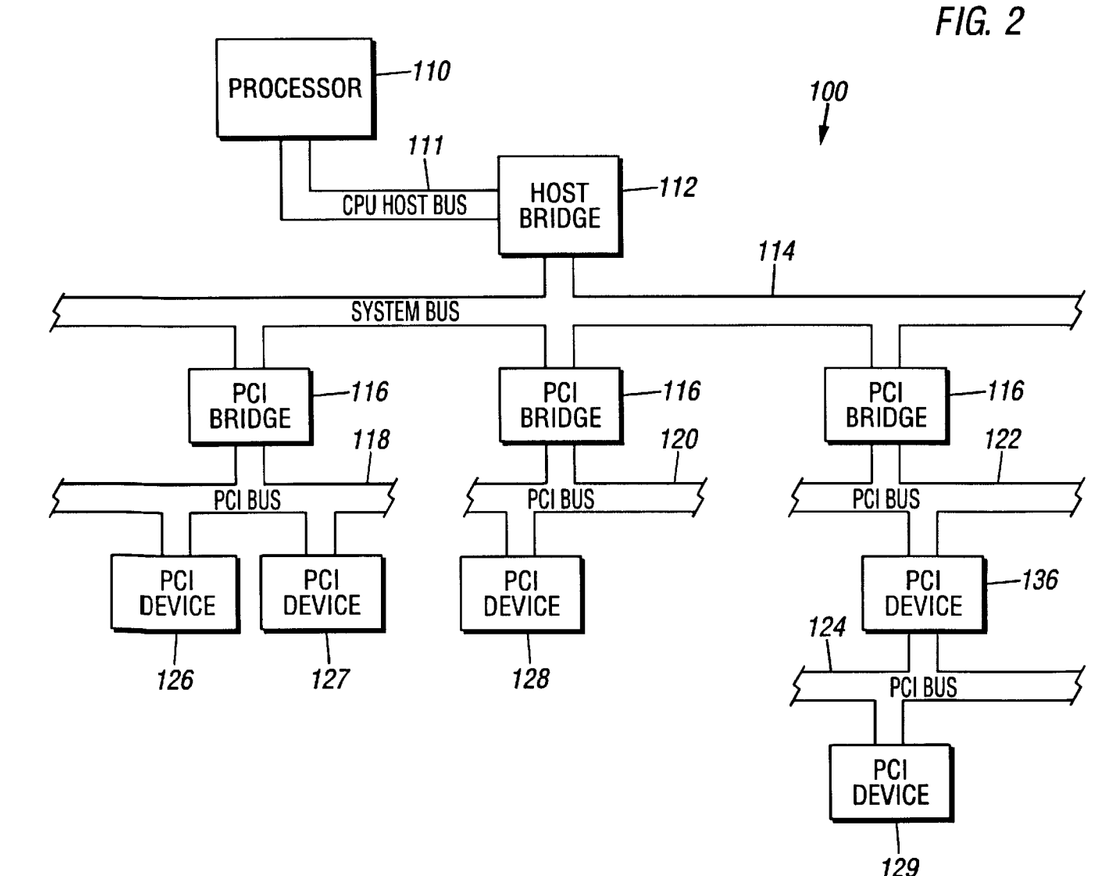
FIG. 2 is a block diagram representation of a computer system architecture with a plurality of peripheral busses in accordance with the preferred embodiment of the present invention.

Referring now to FIG. 2, a computer system 100 constructed in accordance with the present invention includes a processor 110, a host bridge 112, and one or more PCI bridge devices 116. Processor 110 couples to host bridge 112 over a CPU host bus 111. The host bridge 112 couples CPU host bus 111 to a system bus 114. In accordance with normal convention, the host bridge 112 orchestrates the transfer of address, data and controls signals between the host bus 111 and the system bus 114. Processor 110 can be one of a variety of processors such as the Pentium®, Pentium®Pro, Pentium Pro II®, K-6® and the like. The host bus 111 may also couple to other devices on the motherboard, such as a memory controller, DMA circuit, or other computer system components. Moreover, although only one processor is shown in FIG. 2, the computer system 100 may also include additional processors. Although the present invention is described in terms of a computer system, it will be recognized by one skilled in the art that the invention is not limited exclusively to personal computers, but also applies to other types of equipment that include peripheral busses.

The preferred embodiment shown in FIG. 2 includes three peripheral computer interface ("PCI") busses 118, 120, 122, respectively, coupled to system bus 114 through PCI bridge devices 116. The PCI bridge devices may also be used to couple two PCI busses together. This type of configuration is illustrated by PCI bridge device 136 and PCI busses 122, 124. Although four PCI busses and PCI bridge devices are shown in FIG. 2, any number of busses and bridge devices are possible within the physical and electrical power limits of the computer system. Each PCI bus 118, 120, 124 couples to one or more PCI devices 126, 127, 128, 129. In this configuration, processor 110 can communicate with each PCI device 126 through a communications path consisting of CPU host bus 111, host bridge 112, system bus 114, PCI bridge device 116, and a PCI bus 118, 120, 122. In the case of PCI device 129, PCI bridge 136 and PCI bus 124 are also interposed between processor 110 and the PCI device 129. The processor can write data to, read data from, or send commands to any and all PCI devices.

PCI devices 126, 127, 128, 129 generally represent interface or expansion cards that can be plugged into the expansion slots in computer 100. There may be one or more slots associated with each PCI bus. Because of electrical constraints, it is generally recognized that no more than seven or eight PCI devices should be connected to any one PCI bus, although the exact number of PCI devices connected to a PCI bus is not relevant to the present invention. PCI devices 126, 127, 128, 129 may also include devices that are soldered directly to the computer's system board (not specifically shown). Examples of some PCI devices include extended memory cards, video or disk controller cards, network cards, audio cards, or any other device or card interfaced to the computer through the PCI bus. As noted above, while the discussion focuses here on the PCI bus for the sake of simplicity, the present invention is not limited to PCI bus. The present invention may be implemented with other bus structures such as the ISA bus, EISA bus and USB bus architectures.

The present invention allows the multiple PCI busses 118, 120, 122 to be implemented with different protocols to facilitate customization for a particular user or class of users. For example, an operator might desire that PCI busses 118, 120 operate with 5 volt signals levels with a frequency of 33 MHz, while PCI bus 122 is implemented as a 3.3 volt, 66 MHz bus. The present invention further allows each PCI bus to be configured based upon the PCI devices that are coupled to the expansion slots connected to that particular bus. During the power-up/boot-up sequence, or during a hot plug-in (described below), computer system 100 detects and determines the types of PCI devices connected to each bus. Once this determination is made, the busses are configured appropriately. For example, if the computer system determines that only 5 volt cards are connected to PCI bus 118, then that bus is implemented as a 5 volt bus.

By configuring the busses as a result of the types of PCI devices connected to each bus, the computer system 100 is able to accept and communicate with any compatible set of PCI expansion card the operator wishes to insert into the computer. Thus, if only 5 volt cards are inserted into computer 100, then all of the PCI busses are configured for 5 volt operation. If, on the other hand, only 3.3 volt cards are inserted, then the busses are so configured. If a mix of card types is inserted, then the busses can be configured to the cards connected to them. It will also be seen below that alternatively computer system 100 allows individual slots, rather than entire busses, to be configured to match the card type inserted into each slot. Thus, 5 volt power and signals may be provided for one slot while 3.3 volt power and signals may be provided for another slot on the same bus. If the cards connected to a bus require a mix, the bus preferably is configured to operate with a frequency of 33 MHz.

Figure 3:
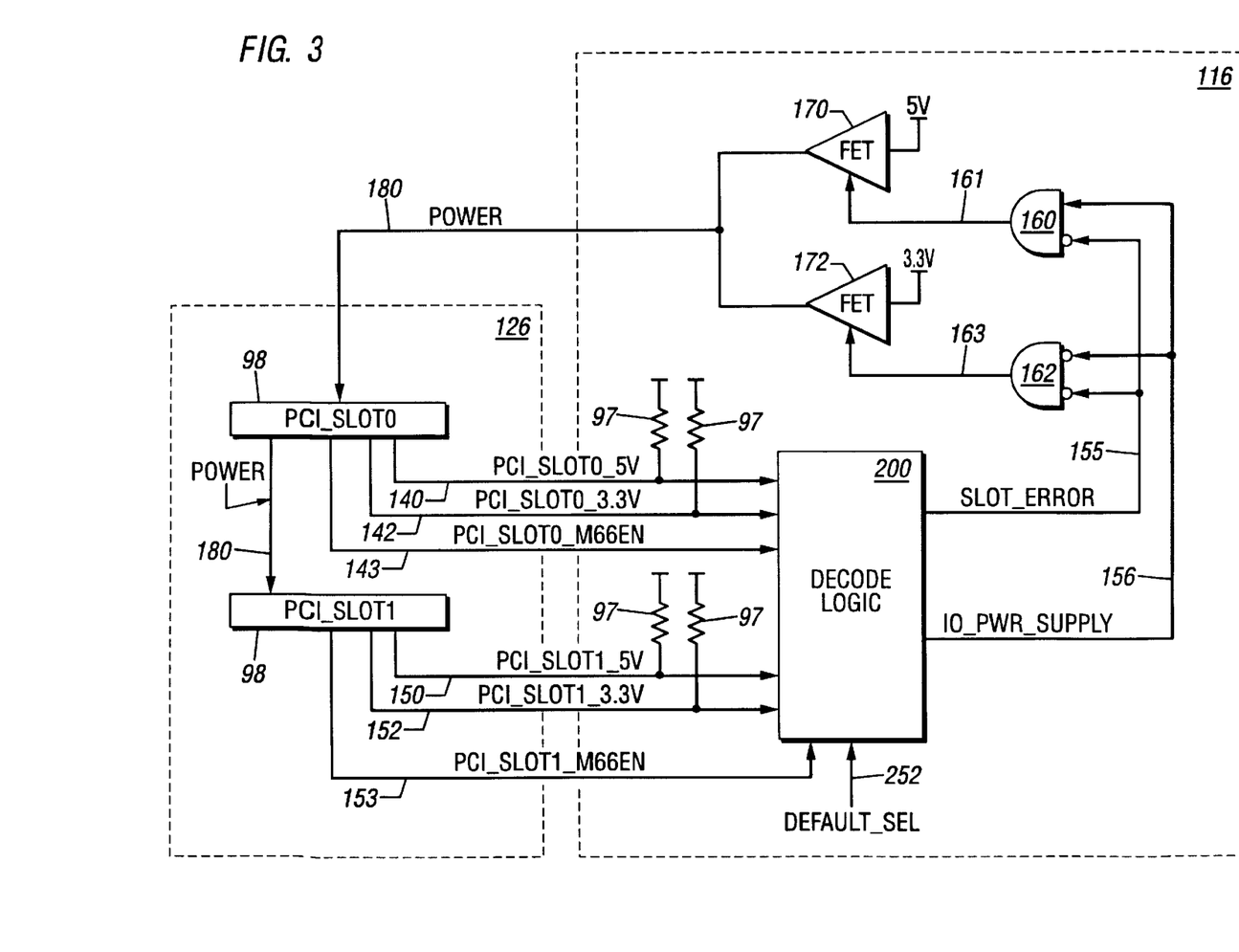
FIG. 3 is a block diagram showing decode logic for sensing card types and controlling power to the peripheral bus.
Figure 4:
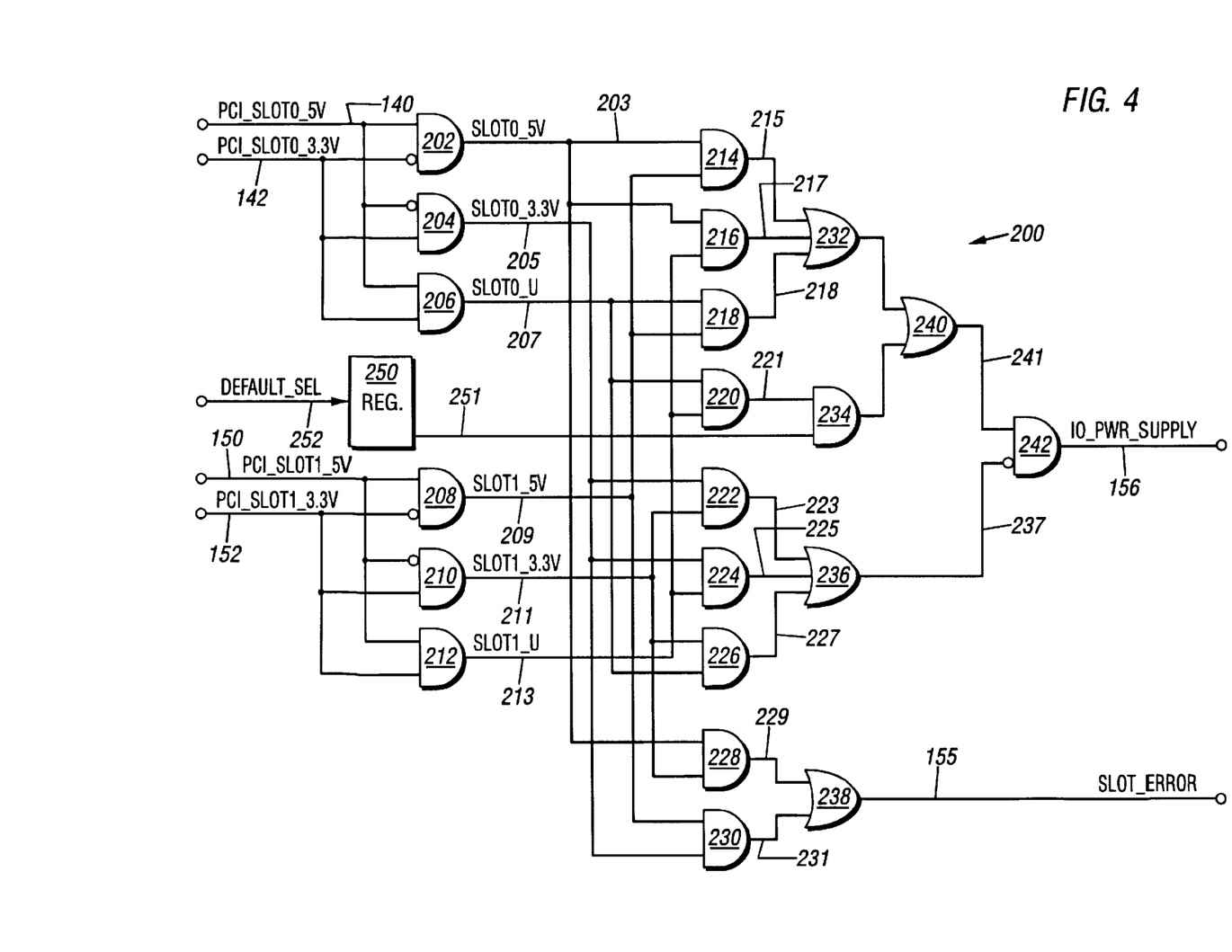
FIG. 4 is a detailed schematic diagram of the decode logic of FIG. 2 in accordance with the preferred embodiment.

The capability to determine the mix of card types connected to the PCI expansion slots can be performed in a variety of ways. One technique is to include logic in the PCI bridge devices 116, 136 to monitor PCI signals indicative of the protocol used by each card. In FIG. 3, for example, decode logic 200 is provided in the PCI bridges that preferably receives several recess signals from each PCI slot connector 98. Typically many other signals are included on a PCI bus, but only the signals of relevance to the present invention are discussed. Decode logic 200 is shown in greater detail in FIG. 4. FIGS. 3 and 4 illustrate the present invention with respect to two PCI card slots, but the principles discussed with reference to those figures may be easily extrapolated to three or more slots, once the principles of the present invention are fully understood.

Referring still to FIG. 3, a PCI bridge device 116 preferably includes decode logic 200, AND gates 160, 162 and power switches 170, 172. Although shown as part of PCI bridge device 116, decode logic 200 and power switches 170, 172 alternatively may not be part of bridge device 116 and may be included in computer system 100 as separate components. Each power switch 170, 172 preferably comprises a conventional power field effect transistor ("FET"). The power switches 170, 172 function to connect a power source to power line 180. Thus, power switch 170 couples a 5 volt power source to power line 180 when activated, and power switch 172 couples a 3.3 volt power source to power line 180 when activated. The power line 180 couples to expansion slots (PCI_SLOT 0, PCI_SLOT I) to provide operating power to the expansion cards inserted in the slots.

The AND gates 160, 162 receive input signals from decode logic 200 and provide output signals to operate power switches 170, 172. The decode logic electrically connects to the PCI slots through three lines. Thus, decode logic 200 couples to slot 0 via lines 140, 142, 143, and to slot 1 via lines 150, 152, 153. Decode logic 200 determines the types of PCI cards inserted into the expansion slot by monitoring the signals on lines 140, 142, 143, 150, 152, 153 and, in response, providing output signals to AND gates 160, 162. The AND gates, in turn, provide output signals to FETs 170, 172 to control the power level to the PCI expansion slot (PCI_SLOT0 and PCI_SLOT1). The signals on lines 140, 142, 143, 150, 152, 153 include PCI_SLOT0_5V, PCI_SLOT0_3.3V, PCI_SLOT0_M66EN, PCI_SLOT1_5V, PCI_SLOT1_3.3V, and PCI_SLOT1_M66EN, respectively, and are described in more detail below. Although the PCI_SLOT0_M66EN and PCI_SLOT1_M66EN signals are provided as inputs to decode logic 200, those signals may be decoded by other logic circuits (not specifically shown). The IO_PWR_SUPPLY signal on line 156 from decode logic 200 to AND gates 160, 162 preferably is a single bit signal. If 5 volt power is desired, IO_PWR_SUPPLY is set to a logic "1" value by decode logic 200, otherwise IO_PWR_SUPPLY is set to a logic "0" value to specify 3.3 volt power.

As noted above, the FET's 170, 172 connect either the 5 volt or the 3.3 volt power supply to power line 180. The output power from the FET's on line 180 is provided to both expansion slots. Preferably, only one FET is switched on at any given time. By determining the output state of AND gates 160, 162, signal IO_PWR_SUPPLY determines which FET 170, 172 to switch on.

The methodology by which the decode logic 200 determines the mix of PCI cards on the bus will now be described. According to the preferred embodiment of FIG. 3, the system board PCI connectors 98 preferably are constructed without the keys 95, 95' shown in FIGS. 1A and 1B. With keyless expansion slot connectors, any expansion card (3.3 volt, 5V, and universal) can be physically connected to any PCI expansion slot, although the cards may still include recesses 85, 85'. In place of the keys 95, 95', PCI expansion slot connectors 98 include electrical contacts (pins). By coupling these pins via conductors 140, 142, 150, 152 to decode logic 200 and also coupling these signals to a logic high voltage source using pull-up resistors 97, the presence or absence of key recesses 85 on the PCI card connectors 80 can be determined. Additionally, a 66 MHz enable (M66EN) signal from each expansion slot connector is provided to decode logic 200. The M66EN signal is asserted by the cards connected to expansion slot connectors 98 to indicate the clock frequency suitable for each card. Thus, the M66EN signal is encoded to indicate whether the card should be operated at 33 MHz or whether the card can operate at 66 MHz.

With the recess signals on lines 140, 142, 143, 150, 152, 153, the type of card coupled to the bus can be ascertained by decode logic 200. When a key recess 85 is present, the pin on expansion slot connector 98 corresponding to the recess will not make electrical contact with a pin on PCI card connector 80 and pins on connector 98 will be at a logic high level because of pull-up resistors 97. When pins are present in place of the key recess 85 on PCI card connector 80, the pins preferably are connected to a ground reference on the PCI card, thereby grounding the corresponding pins on PCI expansion slot connector 98 and forcing the signal on the conductor connected to the pin to a logic low level. Thus, by monitoring the logic state of the pins on connector 98 corresponding to possible key locations on the PCI card connectors 80, the card type can be ascertained.

Some situations may also require computer system 100 to monitor the 66 MHz enable M66EN signals. For example, if universal or 3.3 volt cards are connected to the PCI bus, the M66EN signals from each card must be monitored to determine the appropriate bus frequency for each card. The bus must be configured to operate at the lowest frequency of any one card in order for all cards on the bus to function properly.

The schematic in FIG. 3 shows two slots, PCI_SLOT0 and PCI_SLOT1. Because there may be two key recesses on a PCI card, two recess sense signals are provided from each slot (recess signals on lines 140, 142, 150, 152) to decode logic 200 to indicate whether a card has key recesses and, if so, in which position on the card connector the key recesses are located. As described above, each recess signal is provided to decode logic 200 from pins corresponding to the location of connector keys in previous systems (i.e., keys 95 in FIGS. 1A and 1B). According to the PCI specification, a key recess is present at pin locations 50 and 51 for 5 volt busses or at pin locations 12 and 13 for 3.3 volt busses. For 5 volt PCI card operation, the key on expansion slot connector 98 is replaced by pins 50 and 51 and for 3.3 volt PCI cards, the key is replaced by pins 12 and 13. The PCI expansion slot connectors of the present invention thus are keyless to allow for any card type to be connected to any slot in the computer. Accordingly, signal PCI_SLOT0_5V indicates whether a key recess is present on the PCI card's mating connector corresponding to pins 50 and 51 in PCI_SLOT0. Signal PCI SLOT0_3.3V indicates whether a key recess is present on the PCI card's mating connector corresponding to pins 12 and 13 on the expansion slot connector 98. Signals PCI_SLOT1_5V and PCI_SLOT1_3.3V similarly indicate the present of key recesses on the PCI card connector connected to PCI_SLOT1.

Without connector keys on the expansion slot connectors, it will be possible for an operator to erroneously connect incompatible card types (i.e., 3.3 volt and 5 volt cards) on the same PCI bus. Decode logic 200 determines this error condition and asserts the SLOT_ERROR signal on line 155 to its active level (logic "1"). Thus, if a 5 volt card is connected to PCI_SLOT0 and a 3.3 volt card connected to PCI_SLOT1, or vice versa, SLOT_ERROR is asserted to a logic high state. Otherwise, SLOT_ERROR remains at a logic low state. SLOT_ERROR connects to AND gates 160, 162 through inerting inputs. Thus, if SLOT_ERROR is asserted high (indicating an incompatibility condition), the output signals on lines 161, 163 of AND gates 160, 162 will be at a logic low state, and power FET's 170, 172 will be turned off (or remain off if already off) preventing either 5 volt or 3.3 volt from being provided to PCI expansion slot connectors 98. When SLOT_ERROR is at a logic low state (indicating all cards are compatible), the output of either AND gate 160 or 162 will become a logic high level depending on the logic state of IO_PWR_SUPPLY.

Referring now to FIG. 4, decode logic 200 preferably includes, the combinatorial logic shown, although many other circuit configurations are possible to perform the same or a similar function. Further, the function performed by decode logic 200 may be implemented in software. PCI_SLOT0_5V and PCI_SLOT0_3.3V recess sense signals from the PCI_SLOT0 connector are provided to AND gates 202, 204, 206. PCI_SLOT0_5V is provided to noninverting input terminals on AND gates 202 and 206 and an inverting input on AND gate 204. PCI_SLOT0_3.3V is provided to noninverting input terminals on AND gates 204 and 206 and an inverting input on AND gate 202. The output signal SLOT0_5V on line 203 from AND gate 202 thus becomes active (logic high) when PCI_SLOT0_5V is high and PCI_SLOT0_3.3V is low indicating the presence of a 5 volt card. The output signal SLOT0_3.3V on line 205 from AND gate 204 becomes active when PCI_SLOT0_5V is low and PCI_SLOT0_3.3V is high indicating the presence of a 3.3 volt card. Finally, the output signal SLOT0_U on line 207 from AND gate 206 becomes active when both PCI_SLOT0_5V and PCI_SLOT0_3.3V both are high indicating the presence of a universal card. AND gates 208, 210, and 212 are similarly configured to provide comparable functions for the PCI_SLOT1 connector. Thus, SLOT1_5V on line 209 becomes high if a 5V card is connected to PCI_SLOT1. The SLOT1_3.3V signal on line 211 becomes high if a 3.3 volt card is present and the SLOT1_U signal on line 213 becomes high if a universal card is present.

With the two slot arrangement shown in FIG. 4, there are nine ways to insert three card types (5V, 3.3V, universal) into two expansion slots. The present invention preferably determines which of the nine combinations is present when the computer is powered on. This determination is made by the nine AND gates 214, 216, 218, 220, 222, 224, 226, 228, 230. Each AND gate detects the presence of a single card combination. Table I discussed below summarizes the card combination that is detected by each of these AND gates.

SLOT0_5V and SLOT1_5V are provided to noninverting inputs of AND gate 214 and thus the output signal on line 215 from AND gate 214 becomes a high level when 5 volt cards are inserted into both slots 0 and 1. The output signals from AND gates 216 and 218 become high when one card is a 5 volt card and the other card is a universal card. Thus, the output signals of AND gates 214, 216, 218 indicate that 5 volt power is to be supplied to the PCI bus. These output signals are provided to OR gate 232 which accordingly becomes high if both cards are 5 volt cards or one card is a 5 volt card and the other is a universal card, thereby indicating that 5V power is to be supplied to the bus.

The AND gates 222, 224, 226 provide a similar function to determine when to provide 3.3 volt power to the PCI bus. The output signal from AND gate 222 on line 223 becomes high when both cards are 3.3 volt cards and the output signals from AND gates 224 and 226 become high when one card is a 3.3 volt card and the other is a universal card. The output signal from AND gates 222, 224, 226 are provided to OR gate 236. The output signal from OR gate 236 on line 237 thus becomes high when both cards are 3.3 volt cards or one card is a 3.3 volt card and the other is a universal card, thereby indicating that 3.3 volt power is to be supplied to the bus.

The output signal on line 221 from AND gate 220 becomes high when both cards are universal cards, a situation in which either 5 volt power or 3.3 volt power could be supplied to the bus. Register 250 can be programmed via the DEFAULT_SEL signal on line 252 by the user or during boot-up by a ROM device to specify which power level is to be supplied to the PCI bus when all of the cards connected to the bus are universal cards. The output signal on line 251 from register 250 preferably is a logic high value if 5 volt power is desired when all of the cards are universal cards. Otherwise, the output signal from register 250 will be a logic low value to indicate 3.3 volt power is desired in an all universal card configuration. The output signal from register 250 on line 251 and the output signal from AND gate 220 are provided to AND 234. The output signal from AND gate 234 will become high when both cards are universal cards and the output signal from register 250 is high indicating 5 volt power. Alternatively, the output signal from AND gate 234 will be a logic low state when all cards are universal cards and the output signal from register 250 is a logic low indicating 3.3 volt power.

The AND gates 228 and 230 indicate incompatible card types. The output of AND gate 228 becomes high when slot 0 has a 5 volt card and slot 1 has a 3.3 volt card. Similarly, the output signal from AND gate 230 becomes high when slot 0 includes a 3.3 volt card and slot 1 includes a 5 volt card. These two output signals are provided to OR gate 238 which then provides a single error signal (SLOT_ERROR) on line 155 indicating the presence of incompatible card types.

Table I below identifies the nine card combinations possible given three card types and two slots. Columns 2 and 3 indicate the types of cards that could be inserted into PCI expansion slots 0 and 1, respectively. Column 4 indicates which AND gate is used to determine each card combination as discussed above. Thus, with reference to the row of card combination 1 (5 volt cards in PCI slots 0 and 1) for example, the output signal from AND gate 214 becomes active for card combination 1.

TABLE I

| | Card Combinations | | |
|---|---|---|---|
| Card Combination | PCI_SLOT0 | PCI_SLOT1 | AND Gate |
| 1 | 5 volt | 5 volt | 214 |
| 2 | 5 volt | Universal | 216 |
| 3 | Universal | 5 volt | 218 |
| 4 | Universal | Universal | 220 |
| 5 | 3.3 volt | 3.3 volt | 222 |
| 6 | 3.3 volt | Universal | 224 |
| 7 | Universal | 3.3 volt | 226 |
| 8 | 5 volt | 3.3 volt | 228 |
| 9 | 3.3 volt | 5 volt | 230 |

The output signals from OR gate 232 and AND gate 234 are provided to OR gate 240. The output signal on line 241 from OR gate 240 thus becomes a logic high when 5 volt power is to be supplied to the PCI bus; that is, when both cards are 5 volt cards, one card is a 5 volt card and the other is a universal card, or both cards are universal cards and the output signal from register 250 is high indicating the preference for 5 volt power.

The output signal from OR gate 240 is provided to a noninverting input of AND gate 242 and the output signal from OR gate 236 is provided to an inverting input of AND gate 242. The output signal from AND gate 242 (IO_PWR_SUPPLY) becomes high when the output signal from OR gate 240 is high and the output signal from OR gate 236 is low indicating that 5 volt power is to be supplied to the PCI bus. Conversely, the output signal from AND gate 242 becomes a logic low level when the output signal from OR gate 240 is low and the output signal from OR gate 236 is high indicating that 3.3 volt power is to be supplied.

In addition to providing an appropriate IO power level to the PCI cards, it is also necessary to drive appropriate signal voltage levels to the cards. Preferably, computer system 100 provides 3.3 volt signals to all cards connected to the PCI bus. Signals at 3.3 volt levels are preferred for 3.3 volt PCI cards and 3.3 volt signals are high enough to be recognized as logic high levels by 5 volt cards. Alternatively, the IO_PWR_SUPPLY signal can be used by signal decode logic (not specifically shown) to provide appropriate signal levels. Thus, if only 5 volt cards are coupled to the bus, 5 volt signaling is provided by signal decode logic, whereas 3.3 volt signaling is provided if 3.3 volt only cards are coupled to the bus.

It may also be necessary to select the appropriate clock frequency for the PCI bus. If only 3.3 volt or universal cards are present, the clock frequency is determined by decoding the M66EN signals as described previously. If only 5 volt cards are present, the frequency should be 33 MHz. Circuitry (not specifically shown) in decode logic 200 monitors the state of the M66EN signal and sets the frequency of the PCI bus clock signal accordingly.

Rather than sensing the presence, or absence, of connector key recesses at both the 3.3 volt and 5 volt locations, the present invention can be implemented by sensing only one key location. As such, 3.3 volt cards could be distinguished from 5 volt cards, but 3.3 volt and 5 volt cards could not be distinguished from universal cards. That is, the system could not distinguish a 3.3 volt card from a universal card or a 5 volt card from a universal card. If this limitation is unacceptable, sensing at both key locations can be implemented as described above. Otherwise, the alternative schematic for decode logic shown in FIG. 5 and discussed below can be used.

Figure 5:
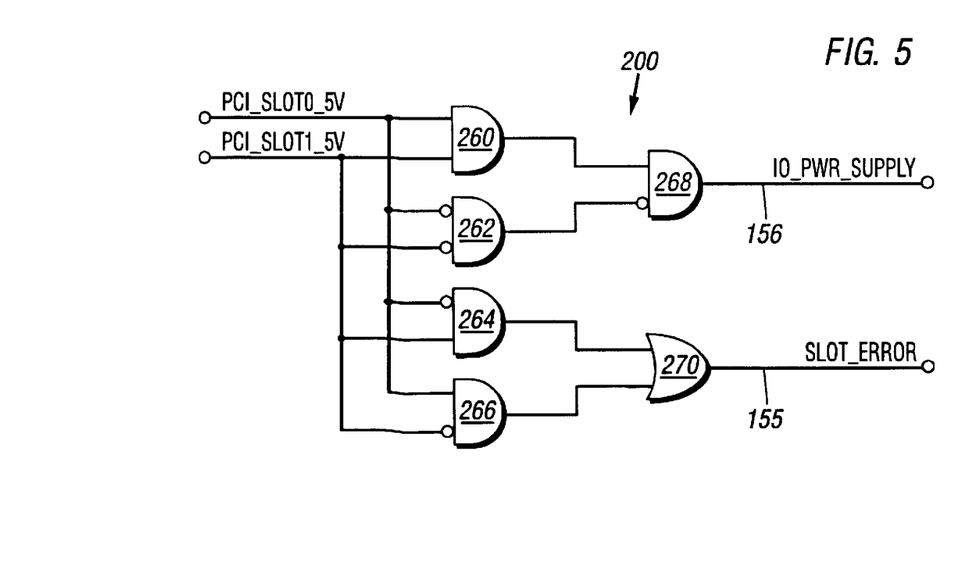
FIG. 5 shows an alternative schematic diagram of the decode logic of FIG. 2.

In FIG. 5 the system, only senses the 5 volt key locations. Signals PCI_SLOT0_5V and PCI_SLOT1_5V are the 5 volt key recess sense signals defined previously. A high logic state for either signal indicates the presence of either a 5 volt or a universal card. The output signal from AND gate 260 thus becomes high if both card slots include 5 volt cards, universal cards, or a mix of a 5 volt and a universal card. For any of these situations, the system preferably provides 5 volt power to the PCI bus. AND gate 262 includes inverting inputs for 5 volt key recess sense signals PCI_SLOT0_5V and PCI_SLOT1_5V and thus goes high if both input signals are low indicating only 3.3 volt cards are connected to the bus. The output signals from AND gates 260 and 262 are provided to AND gate 268 which includes an inverting input terminal to receive the output signal from AND gate 262. The output signal, IO_PWR_SUPPLY, from AND gate 268 thus becomes high if 5 volt power is preferred or low if 3.3 volt power is preferred.

The PCI_SLOT0_5V signal is provided to an inverting input of AND gate 264 and a noninverting input of AND gate 266. PCI_SLOT1_5V is provided to a noninverting input of AND gate 264 and an inverting input of AND gate 266. As such, the output signal from AND gate 264 becomes high if slot 0 has a 3.3 volt card and slot 1 has either a 5 volt or a universal card. Similarly, the output signal from and gate 266 becomes high if slot 1 has a 3.3 volt card and slot 0 has either a 5 volt or a universal card. The output signals from AND gates 264 and 266 thus indicate the presence of either: (1) incompatible card types (i.e., 3.3 volt and 5 volt cards) or (2) a universal card coupled with a 3.3 volt card. The latter scenario is not necessarily an error condition. However, it is not possible to distinguish these two scenarios and thus an error condition preferably is presumed for the second scenario. The output signals from AND gates 264 and 266 are provided to OR gate 270 whose output signal is provided as the SLOT_ERROR signal on line 155.

Figure 6:
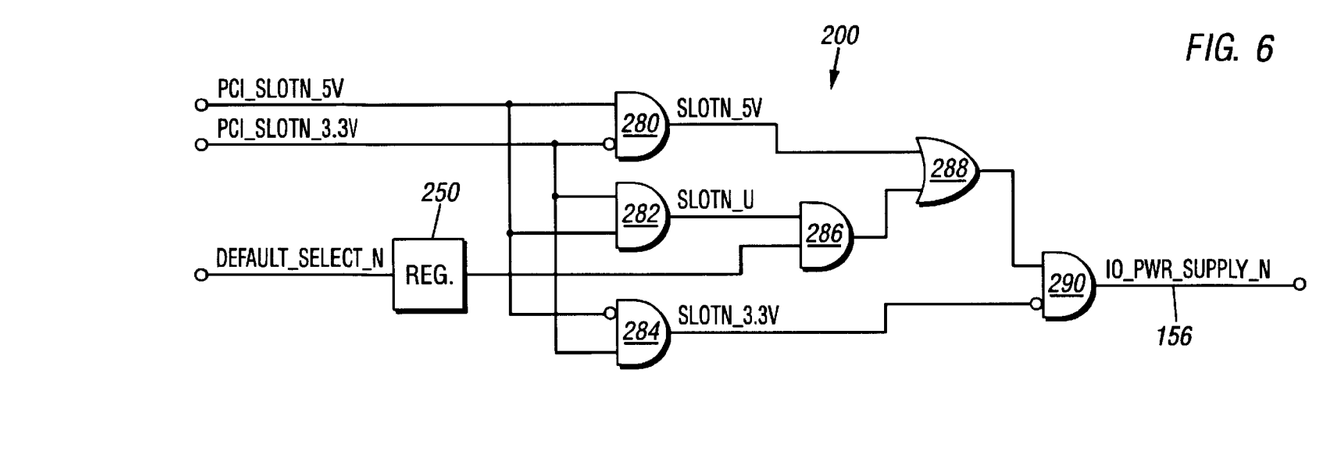
FIG. 6 is a schematic diagram of alternative decode logic to configure the interface bus of an individual slot.

FIGS. 3, 4 and 5 assume that all of the devices or cards on the PCI bus are configured identically. That is, the logic configures the entire bus to operate at either 3.3 volt or 5 volt for the IO power supply and signaling levels. In systems that allow individual slots to be configured independently, then the detection logic shown in FIG. 6 can be applied to configure the PCI slots on a slot-by-slot basis. In FIG. 6, AND gates 280, 282, 284 perform similar functions as AND gates 202, 204, 206 in FIG. 4. The output signal, slotn_5V, of AND gate 280 becomes a logic high level if the card connected to slot n is a 5 volt card. The output signal, slotn_3.3V, of AND gate 284 is a logic high value if the card connected to slot n is a 3.3 volt card. The output signal, slotn_u, of AND gate 282 is a logic high value if the card connected to slot n is a universal card. Register 250 is used to provide a default power supply setting for the slot if the card is a universal card, as described previously. Signal DEFAULT_SELECTn is set high by the operator or a ROM device to indicate the preference for 5 volt power for a universal card or low to indicate the preference for 3.3 volt power. The output signal from register 250 is provided as an input signal to AND gate 286 along with the output signal, slotn_u, from AND gate 282. As such, the output signal from AND gate 286 will become high indicating that the default setting for a universal card is a 5 volt power supply or low indicating the default power supply setting should be 3.3 volt. The slotn_5V and slotn_u (through AND gate 286) signals or provided as input signals to OR gate 288 which will generate a logic high output level if the desired IO power supply for slot n is 5 volt. The AND gate 290 provides the output IO_PWR_SUPPLY_N signal on line 156 and is a logic high value for 5 volt power to slot n or logic 0 for 3.3 volt power. Each slot may have similar logic with an output IO power supply signal to indicate which power supply voltage to provide to that slot.

The PCI expansion slot connectors, in accordance with a preferred embodiment of the invention, do not include keys to thereby allow for connection to various card types. As discussed previously, the keys function not only to prevent coupling incompatible card types to the bus, but also to ensure a reliable connection between expansion slot connectors and card connectors. To help ensure a reliable contact between PCI card connectors and expansion slot connectors, a keyed adapter may be used. The adapter connects to the keyless expansion slot connector. The adapter preferably includes one or more keys. Thus, by coupling the keyed adapter to the keyless expansion slot connector, the expansion slot connector effectively is provided with a key. Further, the adapter preferably is removable so that adapters with different key configurations can be used interchangeably on the same expansion slot connector.

Figure 7:
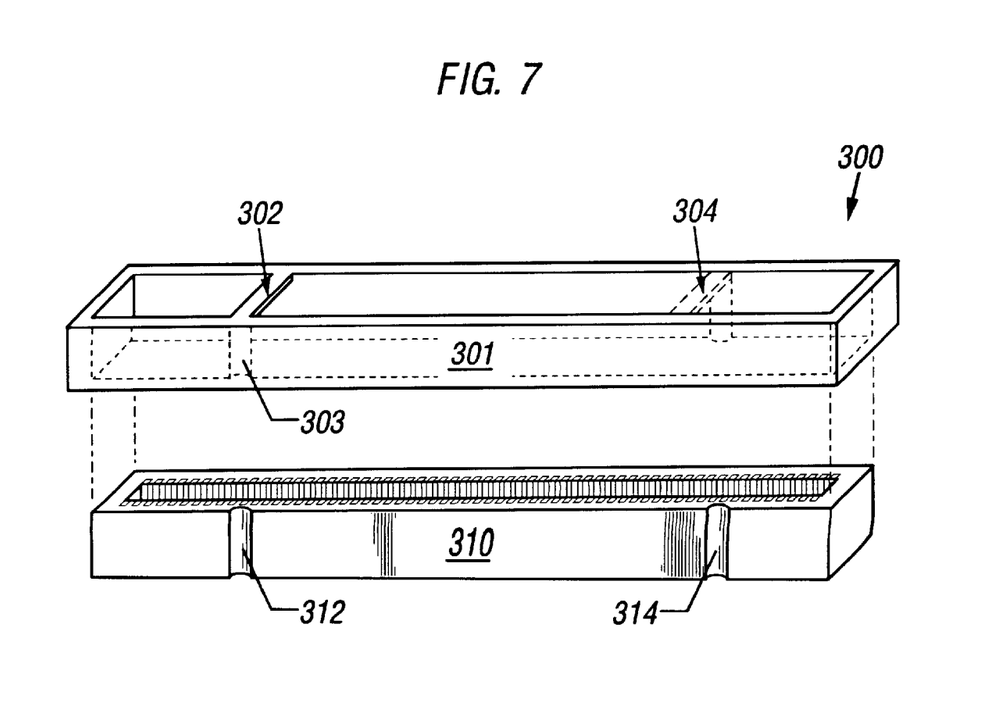
FIG. 7 shows a removable adapter for providing multiple key arrangements for providing a key to a keyless connector.

Numerous adapters and configurations are possible in practicing the present invention. FIG. 7 shows one possible arrangement. Removable adapter 300 includes a housing 301, preferably made of hard plastic or other appropriate material, engages expansion slot PCI connector 310. Adapter 300 may be attached to the keyless connector 310 by friction or by any other suitable means such as by screws or a snap fit. Adapter 300 includes a key 302 and thus, when adapter 300 engages connector 310, connector 310 is effectively provided with key 302. The location of key 302 is positioned to correspond to a particular PCI card type (e.g., 3.3 volt or 5 volt cards). Groove 312 may be included to provide a mating surface for key 302 to ensure proper alignment between housing 301 and connector 310. Key 302 preferably extends down the inside surface of housing 301 as indicated by vertical portion 303. Vertical portion 303 engages groove 312 to maintain adapter 300 in proper orientation and alignment.

The 3.3 volt and 5 volt key in standard PCI cards generally are located equidistant from opposite ends of the connector. Referring still to FIG. 7, key 302 may be located at the 3.3 volt key location. Key location 304, identified in phantom outline, may correspond to the 5 volt key location. Adapter 300 preferably is removable from connector 310 and can be turned 180° and mated with connector 310 so that key 302 engages groove 314. Adapter 300 can thus be used either for 3.3 volt, 5 volt or universal cards. If desired, adapter 300 may also be provided with two keys, one at the 3.3 volt key location and the other at the 5 volt key location.

The key 302 on the removable adapter 300 also may be electrically grounded. Decode logic can then determine the type of PCI card coupled to the adapter by determining whether the key is grounded indicating the presence of a key recess. Accordingly, the key recess detection schemes discussed above can be implemented using removable adapter 300, instead of requiring the expansion card to provide grounded pins in place of key recesses.

The detection logic of FIGS. 3, 4, 5 and 6 may be used during the computer's boot-up process. During boot-up, the decode logic determines the types of boards connected to the PCI bus and configures the bus's clock frequency and IO power supply and signal levels accordingly. Once configured, the PCI bus's power supply level usually cannot be changed without resetting the entire bus. Some computer systems do not allow PCI cards to be connected to the PCI bus after the computer has booted up. In those computers, the computer must be turned off or rebooted before a new PCI card can be inserted. Upon subsequent power up, the PCI bus will provide power and communications to the newly inserted card.

Other computers allow PCI cards to be inserted while the computer is powered on, even after the boot-up process has completed. Plugging a PCI card into a computer that is powered on is commonly referred to as "hot plugging" in the PCI card. PCI busses that allow hot plug PCI cards usually have hot plug logic which may incorporated into the PCI bus bridge to detect when a card has been connected to the bus. The PCI specification requires PCI cards to dedicate two pins to indicate the presence of the PCI card. The signals on these two pins are called PRSNT#1 and PRSNT#2 and are referred to as present detect bits. By polling, or otherwise monitoring, the present detect bits, the hot plug logic can determine when a new card has been connected to the bus. If the PRSNT#1 and PRSNT#2 pins are both open (i.e, unconnected), no PCI card is present. According to the PCI specification, all PCI cards must couple the present detect pins to ground. The presence of a PCI card thus can be ascertained if either or both of the pins are grounded. The PCI bridge device then initializes communications with the newly inserted card. Other card detect schemes are possible and consistent with the present invention.

In computers that allow hot plug PCI cards, the PCI bus includes solid state switches (commonly referred to as "quick switches") which electrically isolate a newly inserted card from the computer's PCI bus. Using the decode logic exemplified in FIGS. 3–6, the computer will determine the type of card that was inserted (whether it was a 3.3 volt, 5 volt, or universal card). Then, if the newly inserted card is compatible with the existing bus configuration, the quick switches are closed allowing the card to communicate with the bus. If the card is not compatible, then an error message may be provided to the operator alerting the operator of the incompatibility. Alternatively, if slot-by-slot configuration is possible, the slot to which the newly connected card was inserted can be configured appropriately for the new card.

The operator may not desire or need any PCI cards to be connected to the computer. In this case, all PCI slots are empty. An empty PCI bus presents the problem of determining which I/O power supply voltage to select initially and what should happen if a card is hot plugged into a previously empty bus whose configuration is incompatible with the newly inserted card. Empty slots cannot be distinguished from universal cards by monitoring the key-ways. However, by monitoring the present detect bits described above, empty slots can be distinguished from universal cards. Ungrounded present detect pins indicate the absence of a card. The default bus configuration may be preprogrammed and can be any valid bus configuration. If a default 66 MHz bus is desired, the default I/O power supply voltage level is preferable 3.3 volt.

If a card is hot plugged into a previously unoccupied PCI bus, the hot plug logic will ascertain the card type and, if necessary, reconfigure the bus to match the card. Alternatively, computer system 100 may not close the quick switches thereby keeping the newly inserted card isolated, if the card is incompatible with the existing bus configuration. In this situation, computer system 100 will alert the operator that the newly inserted card is incompatible.

In a second embodiment of the invention, quick switches can be used to insure compatibility between 3.3 volt and 5 volt cards coupled to the same PCI bus. In this alternative, the expansion slot connectors may or may not be keyed. If they are not keyed, adapter 300 (FIG. 7) is used if necessary to ensure reliable and accurate PCI card-to-expansion slot connector connection. If, however, the expansion slot connectors are keyed, this alternative embodiment allows multiple slots keyed differently to be coupled to the same PCI bus. This embodiment converts 5 volt signals to 3.3 volt signal levels, and thus allows incompatible cards to be coupled to the same PCI bus.

Figure 8:
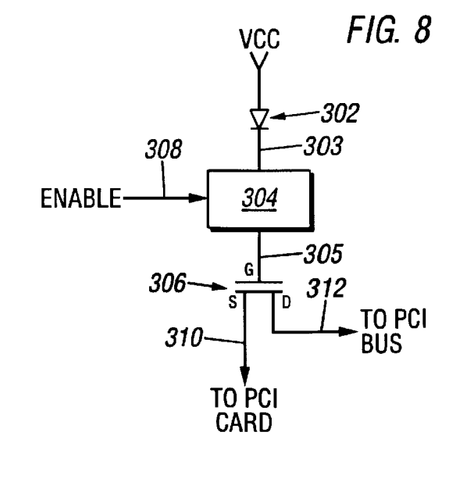
FIG. 8 shows an exemplary circuit for ensuring compatibility between interface cards designed to different signaling standards.

This alternative embodiment is shown in FIG. 8 in which a quick switch circuit 300 includes a quick switch 306 coupled through line 310 to a PCI interface card on a PCI bus. The signal provided to or received from the PCI card on line 310 is also provided through the quick switch to the PCI bus by way of line 312. Accordingly, any other card coupled to the PCI bus will receive the signal on line 310. Quick switch enable circuit 304 is a commonly known quick switch interface circuit that allows the VCC power to enable (turn on) the quick switch using the enable signal on line 308. Quick switch enable circuit 304 couples to the gate G terminal of quick switch 306 by line 305. It should be recognized that a typical PCI bus implementation will have a quick switch circuit such as that shown in FIG. 8 for each signal pin on the PCI expansion slot connectors.

There are numerous quick switches available for use in quick switch circuit 300, such as the QS3384 manufactured by Quality Semiconductor, Inc. The QS3384 includes 10 quick switches packaged together. Thus, a bus with a 24-bit address bus, a 16-bit data bus, and 10 control lines would require five QS3384 devices.

Quick switches are transistors in which a voltage provided to the drain terminal is provided through the transistor to the source terminal, and vice versa. As the drain voltage rises, so does the source voltage. However, there is an upper limit to the source voltage which is generally one volt below the gate voltage. Thus, with a 5 volt gate voltage, the maximum source voltage is approximately 4 V. This electrical characteristic is used to make 5 volt cards compatible with 3.3 volt cards.

The $V_{cc}$ voltage couples to the anode of diode 302 and the cathode of diode 302 couples to quick switch enable circuit 304. Diode 302 may be any commonly known diode consistent with the principles of the invention, such as a 1N4148 diode. As is commonly known, when a diode is turned on (i.e., the diode is conducting current) a voltage drop occurs between the anode and cathode of the diode. The voltage drop typically is 0.7 volts. Thus, if VCC is 5 volt then the voltage level on line 303 is 4.3 V.

The gate G of quick switch 306 will also be at a 4.3 V level. As explained above, the voltage level on the drain D terminal of quick switch 306 is limited to approximately 1 volt less than the gate voltage ($V_D=V_G-1$). If the gate voltage is 4.3 V, then the drain voltage will be 3.3 volt, a voltage level which is compatible with 3.3 volt PCI cards. Thus, if a PCI card coupled to quick switch 306 via line 310 drives a 5 volt signal into the source S of the quick switch, the voltage level on drain D will be 3.3 volt. The quick switch preferably is bidirectional meaning that if either the source S or drain D is driven to 5 volt, the other side will be limited to 3.3 volt. It should also be recognized that a high logic level for a 3.3 volt card includes a range of voltage levels consistent with the PCI specification. Accordingly, diode 302 is not necessarily limited to diodes with 0.7 volt drops while conducting. Any diode voltage drop is acceptable so as to provide a quick switch voltage compatible with the PCI specification.

If a 3.3 volt card drives a 3.3 volt signal into either the drain or source terminals of quick switch 306, the other terminal (drain or source) will also be at 3.3 volt. A voltage magnitude of 3.3 volt is sufficiently high to be recognized as a logic high level by a 5 volt card or 5V bus.

The alternative embodiment discussed above automatically makes the signal levels of 5 volt and 3.3 volt cards compatible. However, it may be necessary to select a clock frequency for operating the bus. By monitoring the M66EN pin on each of the cards coupled to a PCI bus, logic (not specifically shown) will select a 33 MHz clock if all of the cards are 33 MHz cards or 66 MHz if all of the cards are 66 MHz cards. If, however, there is a mix of 33 MHz and 66 MHz cards on the bus, then the logic will select a 33 MHz clock for all PCI cards. The IO power preferably is set to 3.3 volts for this embodiment.

In a third embodiment, all expansion slot connectors are provided with keys corresponding to 5 volt cards (i.e., keys located at pins 50 and 51). As such, only 5 volt or universal cards could be connected to the PCI bus, at the exclusion of 3.3 volt only cards. This option may be acceptable if there are relatively few 3.3 volt cards available in the market or the operator desired not to connect 3.3 volt cards to computer system 100.

With only 5 volt and universal cards on the bus, 5 volt I/O power is supplied to all of the cards. The signaling level will correspond to the signaling level of each card. A 5 volt card can drive 5 volt signals onto the bus and, because universal cards have 5 volt tolerant inputs, a logic high from a 5 volt card will be correctly recognized as a logic high by a universal card without damaging that card. PCI bridges 116, 136 (FIG. 2) will either include 5 volt circuitry or at least have 5 volt tolerant inputs.

A universal card may be either a 3.3 volt or a 5 volt card. Both 3.3 volt and 5 volt signaling will be correctly recognized by 5 volt cards that may also be present on the bus without damaging the 5 volt card. As explained previously, a 3.3 volt signal is sufficiently high to be recognized as a logic high value by a 5 volt card.

In this embodiment it may be necessary to monitor the M66EN pins on the cards to select the appropriate operating frequency as explained above. By monitoring the M66EN pin on each of the cards coupled to a PCI bus, logic (not specifically shown) will select a 33 MHz clock if all of the cards are 33 MHz cards or 66 MHz if all of the cards are 66 MHz cards. If, however, there is a mix of 33 MHz and 66 MHz cards on the bus, then the logic will select a 33 MHz clock as all PCI cards, even 66 MHz cards, can operate from a 33 MHz.

Numerous variations and modifications will become apparent to those skilled in the art once the above disclosure is fully appreciated. It is intended that the following claims be interpreted to embrace all such variations and modifications.

We claim:

1. A computer system, comprising:
   a processor;
   a system bus coupled to said processor;
   a peripheral bus;
   a bus bridge coupling said peripheral bus to said system bus;
   an expansion slot coupled to said bus bridge, said expansion slot configured to receive an expansion card; and
   decode logic configured to determine a voltage-compatibility type for the expansion card that is received in said expansion slot.

2. A system as in claim 1, wherein said decode logic configures said peripheral bus based upon the voltage-compatibility type.

3. A system as in claim 2, wherein said peripheral bus operates at one of a plurality of voltage levels, and said decode logic selects the voltage level for the peripheral bus based upon the voltage-compatibility type.

4. A system as in claim 3 wherein said peripheral comprises a PCI bus and said expansion card comprises a PCI expansion card.

5. A system as in claim 4, further comprising a host bridge connected to the processor via a host bus, and wherein said host bridge also connects to said system bus.

6. The computer system of claim 2, wherein said expansion slot includes a keyless connector, and said expansion card includes a card connector, and wherein said decode logic receives a first recess signal from said expansion slot connector, indicating the presence of a first key recess on said card connector.

7. The computer system of claim 6, wherein said decode logic receives a second recess signal from said expansion slot connector indicating the presence of a second key recess on said card connector.

8. The computer system of claim 7, wherein said peripheral bus comprises a PCI bus, and said expansion card comprises a PCI expansion card, and said first recess signal indicates the PCI expansion card operates with a 3.3 volt signal level and said second recess signal indicates the PCI expansion card operates with a 5 volt signal level.

9. The computer system of claim 8, wherein said decode logic identifies the voltage-compatibility type based upon the first and second recess signals.

10. The computer system of claim 9, wherein and said decode logic selects the voltage level for the peripheral bus based on the first and second recess signals.

11. The computer system of claim 10, wherein said voltage level is selected as a 5 volt level if the first recess signal has a low logic level and the second recess signal has a high logic level.

12. The computer system of claim 10, wherein said voltage level is selected as a 3.3 volt level if the first recess signal has a high logic level and the second recess signal has a low logic level.

13. The computer system of claim 10, wherein said decode logic provides a slot error signal to indicate if the expansion card is incompatible with said expansion slot.

14. The computer system of claim 10, wherein said decode logic determines a universal expansion card is received in said expansion slot if both the first and second recess signals have a logic high level.

15. The computer system of claim 14, wherein a plurality of expansion slots are coupled to said peripheral bus, and said decode logic determines the voltage-compatibility type for an expansion card inserted in each expansion slot, and only configures said peripheral bus if all expansion cards are compatible.

16. The computer system of claim 14, wherein a plurality of expansion slots are coupled to said peripheral bus, and said decode logic determines the voltage-compatibility type for an expansion card inserted in each expansion slot, and said decode logic selects a voltage level.

17. The computer system as in claim 3 further comprising a first removable key adapted to be placed in the expansion slot at a location which indicates the voltage-compatibility type, said removal key coupled to the decode logic.

18. The computer system of claim 17 wherein said removable key becomes electrically grounded once placed into the expansion slot and the decode logic determines the location of the removable key.

19. The computer system as in claim 17 wherein said removable key causes a change in state of a signal thereby indicating the location of the removable key to the decode logic.

20. The computer system as in claim 17 further including an additional removable key adapted to be placed in the expansion slot at a location indicative of a second voltage compatibility type, said additional removable key coupled to said decode logic.

21. The computer system as in claim 20 wherein each of said removable keys cause a change in the state of a signal indicating the presence of the removable keys to the decode logic.

22. The computer system of claim 2, wherein said decode logic includes a first power switch for providing 5 volt power to said expansion card and a second power switch for providing 3.3 volt power to said expansion card.

23. The computer system of claim 22, wherein said decode logic selectively activates one of the first and said second power switches based upon the voltage-compatibility type.

24. The computer system of claim 23, wherein neither power switch is activated if the voltage-compatibility type is unsupported by the expansion slot.

25. The computer system of claim 2, further including hot-plug logic for determining when a newly inserted expansion card is inserted in an expansion slot when the computer system is powered on and said peripheral bus has already been configured, wherein said decode logic determines whether the newly inserted expansion card is compatible with said peripheral bus voltage levels and directs said hot-plug logic to prevent said newly inserted expansion card from being powered on if the newly inserted expansion card is incompatible with said peripheral bus voltage levels.

26. A computer system, comprising:

a processor;

a system bus coupled to said processor;

an expansion slot coupled to said system bus and configured to receive an expansion card; and a removable connector adapter mounted on said expansion slot, said connector adapter including at least one key for mating with a key recess on said expansion card wherein said key is electrically grounded and said computer system determines the type of said expansion card based on said grounded key.

27. The computer system of claim 26, wherein the expansion slot is on a PCI bus and the type of card that can be received is selected by turning the connector adapter 180°.

28. A method for configuring a PCI bus in a computer system that includes at least one PCI expansion slot connector for mating with a PCI expansion card, comprising:

(a) determining whether an expansion card is inserted in said expansion slot connector;

(b) receiving at least one recess signal from said expansion slot connector;

(c) determining the type of expansion card based upon said recess signal; and (d) configuring the PCI bus by selecting a power voltage level for the PCI bus according to the determination made in step (c).

29. The method of claim 28, wherein said step of determining whether an interface card is inserted in said expansion slot connector (step (a)) includes monitoring a present detect bit.

30. A computer system including at least one expansion slot for receiving an expansion card and for coupling said expansion card to said computer system, comprising:

a peripheral bus electrically coupling said expansion slot to said computer system; and a converter electrically connecting said expansion slot to said peripheral bus, said converter providing signal level compatibility between said expansion card and said peripheral bus.

31. A computer system as in claim 30, wherein said expansion card provides 5 volt signals, and said converter converts said 5 volt signals from said expansion card to 3.3 volts.

32. The computer system in claim 31, wherein said converter couples to a voltage source through a diode.

33. A computer system, comprising:

a processor;

a system bus coupled to said processor;

a peripheral bus;

a bus bridge coupling said peripheral bus to said system bus;

an expansion slot coupled to said bus bridge, said expansion slot receiving an expansion card and said expansion slot providing a recess signal and a frequency enable signal from said expansion card to said bus bridge said recess signal indicates the presence of a key recess on said expansion card and said frequency enable signal indicates the clock frequency for the expansion card;

wherein said bus bridge includes decode logic for determining the type of expansion card that is received in said expansion slot based upon said recess signal and said frequency enable signal and said decode logic configures said peripheral bus based upon the type of expansion card received in the expansion slot.

34. A method for configuring a bus in a computer system that includes at least one expansion slot for mating with an expansion card, comprising:

(a) determining the type of expansion card based upon the presence of a removable key; and (b) configuring the bus by selecting a power voltage level according to the determination made in step (a).

35. The method of claim 34 wherein step (a) further comprises:

(a1) placing a first removable key in said expansion slot at a first location;

(a2) changing a first signal level associated with said first removable key indicating the presence of the first removable key.

36. The method of claim 35 where step (a) further comprises:

(a3) placing a second removable key in said expansion slot at a second location;

(a4) changing a second signal level associated with said second removable key indicating the presence of the second removable key.

37. A computer system, comprising:

a processor;

a system bus coupled to said processor;

an expansion slot coupled to said system bus, said expansion slot receiving an expansion card a removable connector adapter mounted on said expansion slot for receiving said expansion card, said connector adapter including at least one key for mating with a key recess on said expansion card; and decode logic wherein said key electrically couples to said decode logic which determines the type of expansion card based on said electrical coupling.

* * * * *

UNITED STATES PATENT AND TRADEMARK OFFICE
CERTIFICATE OF CORRECTION

PATENT NO. : 5,930,496
DATED : July 27, 1999
INVENTOR(S) : John M. MAcLAREN; Brian HAUSAUER and Usha RAJAGOPALAN It is certified that error appears in the above-identified patent and that said Letters Patent is hereby corrected as shown below:

On the title page, item [75],
Inventors: Usha "Rajagopaian" should read Usha --Rajagopalan--.

Signed and Sealed this

Twentieth Day of June, 2000

*Attest:*

Q. TODD DICKINSON

*Attesting Officer*      Director of Patents and Trademarks